US012623252B2

(12) United States Patent
Hausammann et al.

(10) Patent No.: US 12,623,252 B2
(45) Date of Patent: May 12, 2026

(54) SIEVE AND FRAME WITH IMPROVED CONNECTABILITY

(71) Applicant: Bühler AG, Uzwil (CH)

(72) Inventors: Kevin Hausammann, Gallen (CH); Daniel Dörig, Frauenfeld (CH); Jürgen Moosmann; Oliver Schoch, Arbon (CH)

(73) Assignee: Bühler AG, Uzwil (CH)

( * ) Notice: Subject to any disclaimer, the term of this patent is extended or adjusted under 35 U.S.C. 154(b) by 0 days.

(21) Appl. No.: 18/721,498

(22) PCT Filed: Dec. 20, 2022

(86) PCT No.: PCT/EP2022/025584
§ 371 (c)(1),
(2) Date: Jun. 18, 2024

(87) PCT Pub. No.: WO2023/117137
PCT Pub. Date: Jun. 29, 2023

(65) Prior Publication Data
US 2025/0058354 A1 Feb. 20, 2025

(30) Foreign Application Priority Data
Dec. 20, 2021 (EP) ..................................... 21215869

(51) Int. Cl.
*B07B 1/38* (2006.01)
*B07B 1/46* (2006.01)
*B07B 1/48* (2006.01)

(52) U.S. Cl.
CPC .............. *B07B 1/4645* (2013.01); *B07B 1/38* (2013.01); *B07B 1/4618* (2013.01); *B07B 1/48* (2013.01)

(58) Field of Classification Search
CPC .......... B07B 1/38; B07B 1/48; B07B 1/4618; B07B 1/4645
(Continued)

(56) References Cited

U.S. PATENT DOCUMENTS 3,565,251 A 2/1971 Pennington
3,664,503 A * 5/1972 Felden .................. B07B 1/4645 209/397

(Continued)

FOREIGN PATENT DOCUMENTS

CN 111014029 A * 4/2020 ........... B07B 1/4618
DE 197 06 601 C1 11/1998

(Continued)

OTHER PUBLICATIONS

Ausperger, Annals of DAAAM for 2011 & Proceedings of the 22nd International DAAAM Symposium, vol. 22, No. 1, ISSN 1726-9679.

*Primary Examiner* — Terrell H Matthews
(74) *Attorney, Agent, or Firm* — Colson Law Group, PLLC

(57) ABSTRACT

A sieve, comprising outer bars and inner bars and sieving areas with sieving fabric being formed between the outer bars and the inner bars, wherein at least a portion of the outer bars is provided as elastomeric part and at least a portion of the inner bars is provided as elastomeric part, wherein said elastomeric parts can be transferred from a first untensioned state into a second tensioned state. The present invention is furthermore related to a sieve frame to which the sieve can be fixed in a tensioned state, as well as to a sieving device such as a plansifter comprising said sieve and/or sieve frame.

14 Claims, 6 Drawing Sheets

(58) Field of Classification Search
USPC .......................................................... 209/363
See application file for complete search history.

(56) References Cited

U.S. PATENT DOCUMENTS

| | | | | | |
|---|---|---|---|---|---|
| 4,137,157 | A * | 1/1979 | Deister | ..................... | B07B 1/48<br>209/403 |
| 5,051,171 | A * | 9/1991 | Hukki | ....................... | B07B 1/54<br>209/385 |

FOREIGN PATENT DOCUMENTS

| | | | | | |
|---|---|---|---|---|---|
| EP | 0330846 | A2 | 9/1989 | | |
| EP | 0 584 302 | B1 | 3/1994 | | |
| WO | WO-2016016322 | A1 * | 2/2016 | ............... | B07B 1/46 |

* cited by examiner

SIEVE AND FRAME WITH IMPROVED CONNECTABILITY

The present invention is related to a sieve and a frame with improved connectability.

Sieves find widespread application in industrial applications where a separation or sorting of materials according to their particle size is required. As an example, plansifters may be mentioned.

A plansifter, in particular a large plansifter or square plansifter, is a cube-shape device with large surface elements and is used to sift grist-, semolina- and flour-like products in the milling industry and for sorting of different grain types of cereals and the like. Sieves are provided in a plansifter that are set in an oscillating motion by means of a respective drive in the plansifter.

In a plansifter, all possible sizes of sieve meshes are used, from approximately 60 μm upwards. For all of them it is equally important to achieve maximum sifting performance without sieve mesh clogging.

The sieve fabric is provided in a pre-tensioned form on an insertion frame which is in turn inserted into a sieve frame which has a base plate and an outlet for fine material, and optionally as well as freely movable cleaning elements, as described e.g. in DE 197 06 601 C1, EP-0 584 302 B1, EP-0 330 846 A1 or U.S. Pat. No. 3,565,251 A and others.

Several factors influence the operation of the plansifter. For example, a freshly spanned sieve fabric regularly works better, since not only the fabric wear but also the degree of tension of the sieve fabric is important.

Exchanging a worn fabric is burdensome. First, the worn fabric has to be removed (ripped off). The so exposed surface has to be ground and freed from remaining glue and steel dust (in order to prevent corrosion). Then, glue has to be applied onto the cleaned surface, and a conditioned (under appropriate humidity conditions) fabric has to be fixed on the surface in a required tensioned state with the aid of said glue.

Typically, users of plansifters are not capable of performing all those steps on site. Especially for the sieving of abrasive materials such as maize or sugar, there is no affordable solution which would allow for an easy replacement of worn sieve fabric. For example, it is known to use sieve stacks made of high-grade polyurethane in combination with stainless steel frame inserts. However, this concept still faces problems of corrosion (between the frame insert and the PU stack) when used for abrasive materials, as well as wear of the fabric.

It was the problem underlying the present invention to overcome the problems of the above prior art and to provide a sieve system that can be easily replaced and is suitable for abrasive material.

The above problem has been solved by the subject-matter of the claims.

In detail, the present invention is related to a sieve, comprising outer bars and inner bars and sieving areas with sieving fabric being formed between the outer bars and the inner bars, characterized in that at least a portion of the outer bars is provided as elastomeric part and at least a portion of the inner bars is provided as elastomeric part, wherein said elastomeric parts can be transferred from a first untensioned state into a second tensioned state.

The sieve according to the present invention can replace the insertion frames conventionally used in sieving devices such as plansifters. By the provision of portions of outer bars and inner bars of the sieve as elastomeric parts, said sieve may be firmly attached in a tensioned state onto an appropriate counter-part, preferably a sieve frame. The elastomeric parts are in a first untensioned state when the sieve is in a free state. When the sieve is to be attached onto an appropriate counterpart, preferably a sieve frame, the elastomeric parts may be inserted into respective counter-portions of said counter-part and thereby transferred from said first untensioned state into a second tensioned state. This results in a tensioning of the sieve (respective the fabric thereof) in an attached state, i.e. when the sieve is firmly attached to said appropriate counterpart, preferably sieve frame.

The sieve according to the present invention can be easily removed from said appropriate counter-part, preferably sieve frame, by removing the elastomeric parts from the respective counter-portions of said counter-part.

According to a preferred embodiment of the present invention, the sieve operates like a click-spring.

The sieve according to the present invention has a general structure that is similar to an insertion frame of a conventional plansifter. In other words, the sieve comprises outer bars which form the outer boundaries of the sieve and enclose a sieving area. According to a preferred embodiment of the present invention, the sieve comprises four (4) outer bars that are connected so as to form a rectangle or a square. A rectangular form is preferred. In said rectangle or square, one or more inner bars are provided. Preferably, said inner bars extend from one outer bar to another opposite outer bar.

According to a preferred embodiment of the present invention, the inner bars are arranged within said rectangle or a square provided by said outer bars such that rectangular or square sieving areas are formed. In other words, the inner bars are arranged such that they divide the area enclosed by the outer bars into smaller rectangular or square sieving areas. Preferably, said smaller rectangular or square sieving areas have the same area.

According to a preferred embodiment of the present invention, 2-12 intersecting inner bars are provided, which divide the area enclosed by the outer bars into a respective number of smaller rectangular or square sieving areas, for example 4-49 sieving areas.

In these sieving areas, a sieving fabric is provided. This can be achieved by conventional methods used for conventional insertion frames. According to a preferred embodiment of the present invention, however, the sieving fabric is provided in said outer bars and inner bars. A similar concept has already been described in DE 197 06 601 C1.

Preferably, said sieving fabric is provided in said outer bars and inner bars by back-injection moulding. Back-injection moulding is known in the art (e.g. Ausperger, Annals of DAAAM for 2011 & Proceedings of the 22nd International DAAAM Symposium, Volume 22, No. 1, ISSN 1726-9679). In back-injection moulding, Fabric trim is inserted directly into the injection mould of an injection-moulding machine, in a pre-tensioned state, and subsequently covered by molten plastic. Fabric and plastic are inseparably connected during this process.

The sieve according to the present invention is reduced in height, as compared to conventional sieve frames. This allows 10 the provision of more sieves of the present invention in a sieving device such as a plansifter. For example, the sieve according to the present invention may have a height of 1-1.5 cm.

According to a particularly preferred embodiment of the present invention, the sieving fabric is embedded within said outer bars and inner bars, for example by back-injection moulding. In other words, on one or on both sides of the sieving fabric there is provided material forming the outer bars and inner bars.

The outer bars and inner bars of the sieve of the present invention comprises at least a portion that is provided as elastomeric part. Any elastomeric material that is able to withstand tension forces of up to 4000 N an be used. Preferably, said elastomeric material is non-toxic and thus acceptable for food applications. As an example, a thermoplastic polyurethane material such as sold by BASF may be used.

The form of said elastomeric parts has to be such that when the sieve is to be attached onto an appropriate counterpart, preferably a sieve frame, the elastomeric parts may be inserted into respective counter-portions of said counter-part and thereby transferred from a first untensioned state into a second tensioned state. This results in a tensioning of the sieve (respective the fabric thereof) in an attached state, i.e. when the sieve is firmly attached to said appropriate counterpart, preferably sieve frame.

Any form of said elastomeric parts that provides for the above function can be used. According to a preferred embodiment of the present invention, the elastomeric parts of said outer bars have a nose-like shape. By "nose-like shape" there is meant a shape where one side of said elastomeric part is oblique, at least a portion of said side, preferably more than 50% of said side. The other side of said elastomeric part preferably comprises a recess into which a part of a respective counter-portion of an appropriate counter-part such as a sieve frame may be inserted and fixed. Such a shape allows an easy insertion and tensioned fixation of said elastomeric parts in said respective counter-portion of an appropriate counter-part such as a sieve frame. Such a shape is known from parts of a conventional click fastener, for example.

According to a preferred embodiment of the present invention, as described above the sieve fabric is embedded in the outer bars. In this embodiment, the elastomeric part of the outer bars is formed on only one side of said fabric.

According to a particularly preferred embodiment of the present invention, the elastomeric part extends over the entire length of a respective outer bar. In cases were lower tensional forces act on the sieve it is, however, also possible that only 20-90%, preferably 30-80%, most preferably 40-70% of the length of a respective outer bar is formed from said elastomeric part.

According to a preferred embodiment of the present invention, the elastomeric parts of said inner bars have a clip-like shape.

Such a shape is known from parts of a conventional click fastener, for example. Preferably, said clip-like shape comprises two separate elongated portions extending away from each other. More preferably, said separate elongated portions extend away from each other enclosing between them an angle from 5° to 40°, preferably 10° to 25°.

Such a shape allows an easy insertion and tensioned fixation of said elastomeric parts in a respective counter-portion of an appropriate counter-part such as a sieve frame.

According to a preferred embodiment of the present invention, as described above the sieve fabric is embedded in the inner bars. In this embodiment, the elastomeric part of the inner bars is formed on only one side of said fabric.

In the sieve according to the present invention, intersecting inner bars are provided, as described above. Preferably, said elastomeric parts of said inner bars extend over the entire length of said inner bars with the exception of cross-section areas of said inner bars, i.e. areas where inner bars intersect. The distance from a cross-section point of two inner bars and the point where the elastomeric parts of said inner bars begin is not particularly limited. If high tensional forces are to be applied onto the sieve, said distance should be kept as small as possible, in order to provide as much elastomeric parts as possible for fixation. In cases were lower tensional forces act on the sieve it is, however, also possible that only 20-90%, preferably 30-80%, most preferably 40-70% of the length of a respective inner bar is formed from said elastomeric part.

In the sieve according to the present invention, any sieve fabric conventionally used for sieves, in particular in sieves for plansifters, can be used.

Accordingly, the present invention is also related to a sieve frame, comprising a side outlet area and a bottom plate, outer profiles and inner profiles, characterized in that said outer profiles and inner profiles comprise in at least a part of their upper surface a groove.

The sieve frame of the present invention is characterized by counter-portions into which the elastomeric parts of the outer bars and inner bars of the sieve of the present invention can be fixed under tension. These counter-portions are grooves in at least a part of the upper surface of outer profiles and inner profiles of said sieve frame.

The sieve frame according to the present invention has a general structure that is similar to a sieve frame of a conventional plansifter. In other words, the sieve frame comprises outer profiles which form the outer boundaries of the sieve frame and enclose an area. According to a preferred embodiment of the present invention, the sieve frame comprises four (4) outer profiles that are connected so as to form a rectangle or a square.

A square form is preferred. In said rectangle or square, one or more inner profiles are provided. Preferably, said inner profiles extend from one outer profile to another opposite outer profile.

According to a preferred embodiment of the present invention, in at least one, preferably one, of said outer profiles there may be provided an additional material outlet.

According to a preferred embodiment of the present invention, in the area surrounded by the outer profiles there is provided a side outlet, e.g. for finer material. The side outlet is a portion that is separated from the remaining inner area surrounded by the outer profiles, and typically has a rectangular form. Sieve frames with such side outlets are known.

According to a preferred embodiment of the present invention, the inner profiles are arranged within said rectangle or a square provided by said outer profiles such that rectangular or square bottom areas are formed in the remaining inner area surrounded by the outer profiles, i.e. the area without the side outlet. In other words, the inner profiles are arranged such that they divide the remaining area enclosed by the outer profiles into smaller rectangular or square bottom areas. Preferably, said smaller rectangular or square bottom areas have the same area.

According to a preferred embodiment of the present invention, 2-12 intersecting inner profiles are provided, which divide the remaining area enclosed by the outer profiles into a respective number of smaller rectangular or square bottom areas, for example 4-49 bottom areas.

The outer profiles and inner profiles have grooves in at least a part of the upper surface thereof. Said grooves have a form that the elastomeric parts of the outer bars and inner bars of the sieve of the present invention can be inserted and fixed therein under tension. In other words, the outer profiles and inner profiles of the sieve frame of the present invention have such a distance from one another that the elastomeric parts of the outer bars and inner bars of the sieve of the present invention can be inserted therein only when a tension force is exerted.

Through this insertion, preferably by clipping, tensioning of the sieve is achieved. This tension force continues to act on the sieve once the sieve has been fixed. Moreover, the clipping connection allows easy replacement of the sieve, if necessary. Since no glueing is involved any longer, no respective problems of corrosion arise according to the present invention.

According to a particularly preferred embodiment of the present invention, the grooves extend over the entire length of an upper surface of a respective outer profile or inner profile. In cases were lower tensional forces act on the sieve it is, however, also possible that only 20-90%, preferably 30-80%, most preferably 40-70% of the length of a respective outer profile or inner profile comprises a groove in its upper surface.

According to a particularly preferred embodiment of the present invention, said sieve is fixed in said sieve frame by insertion of its elastomeric parts into the grooves in the upper surface of the outer profiles and inner profiles of the sieve frame.

According to a preferred embodiment of the present invention, the outer profiles are connected to each other via edges having an upper end and a lower end.

According to a particularly preferred embodiment of the present invention, said sieve frame is completely made of stainless steel. This allows the use of said sieve frame for the sieving of abrasive materials, such as maize or sugar.

The sieve and the sieve frame of the present invention may be used in any conventional sieving device, such as a plansifter, purifier or a grain cleaning machine.

Accordingly, the present invention is also related to a sieving device, comprising at least one sieve according to the present invention, and/or a sieve frame according to the present invention. Preferably, said sieving device comprises a sieve frame according to the present invention wherein a sieve according to the present invention is fixed in said sieve frame by insertion of its elastomeric parts into the grooves in the upper surface of the outer profiles and inner profiles of the sieve frame.

According to a preferred embodiment of the present invention, more than one sieve frame is provided in said sieving device.

According to a preferred embodiment of the present invention, said sieving device is a plan sifter, preferably a plan sifter of a food or animal feed mill.

Such sieving devices, in particular, such plansifters, are known and need not be described here in detail.

As described above, due to the reduction of height, as compared to conventional sieve frames, more sieves of the present invention can be provided in a sieving device such as a plansifter.

The present invention will be explained below in more detail with reference to non-limiting examples and drawings.

FIG. 1 shows a top view of an embodiment of a sieve according to the present invention FIG. 2 shows a sectional view along the line A-A of the embodiment of the sieve of FIG. 1

FIG. 3*a* is an enlarged view of the section z of the sieve of FIG. 2

FIG. 3*b* is an enlarged view of the section y of the sieve of FIG. 2

FIG. 3*c* is an enlarged view of the section x of the sieve of FIG. 2

Figure 1:
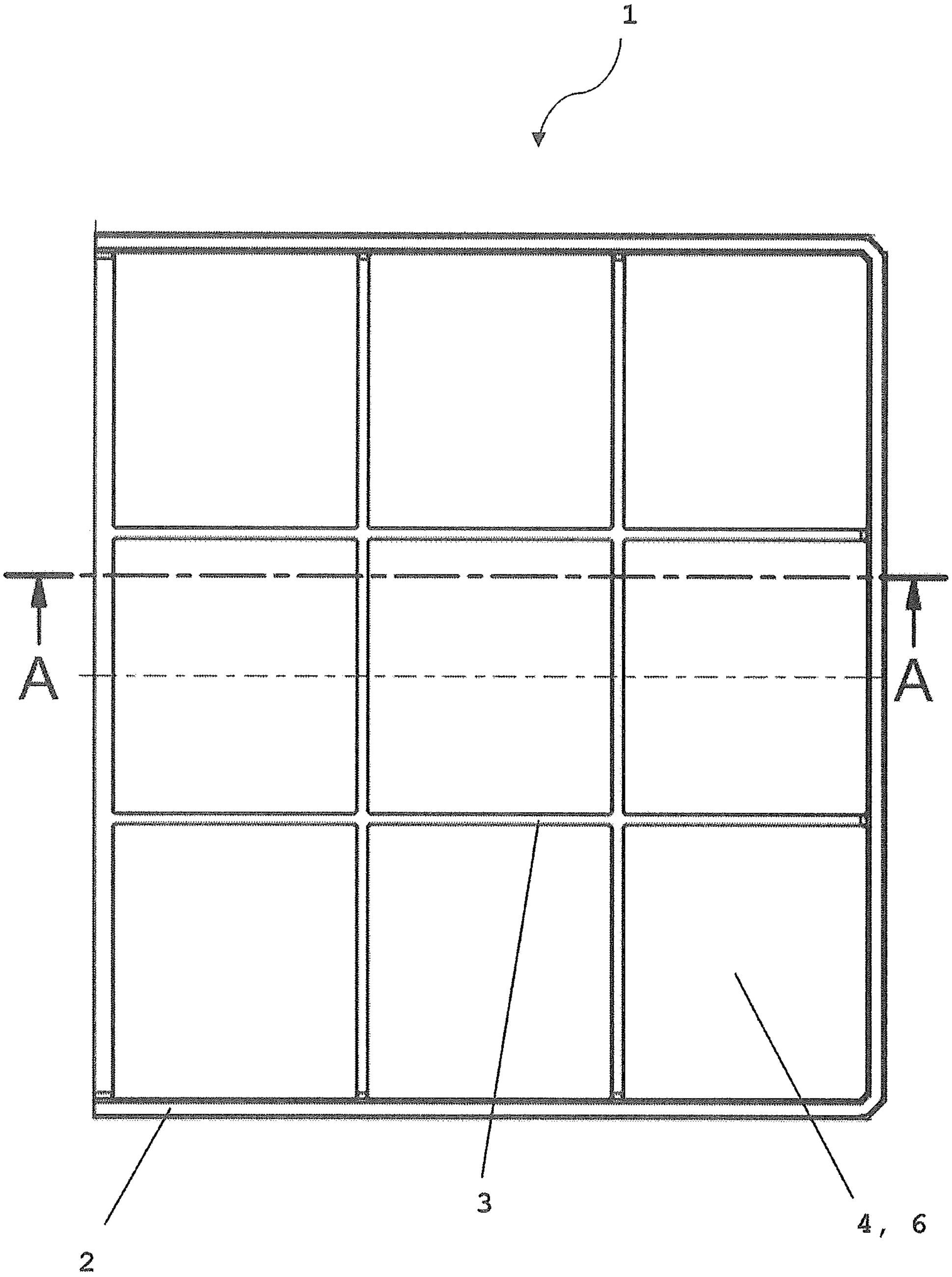

FIG. 1 shows a top view of an embodiment of a sieve 1 according to the present invention. The sieve 1 comprises four outer bars 2 and four inner bars 3. The outer bars 2 form a rectangle having a width of 60-70 cm and a length of 70-80 cm. The inner bars 3 are arranged such between the outer bars 2 that nine sieving areas 4 of the same area are formed. In the sieving areas 4 there is provided a sieving fabric 6. The sieve 1 has a height of 1 cm to 1.5 cm.

Figure 2:
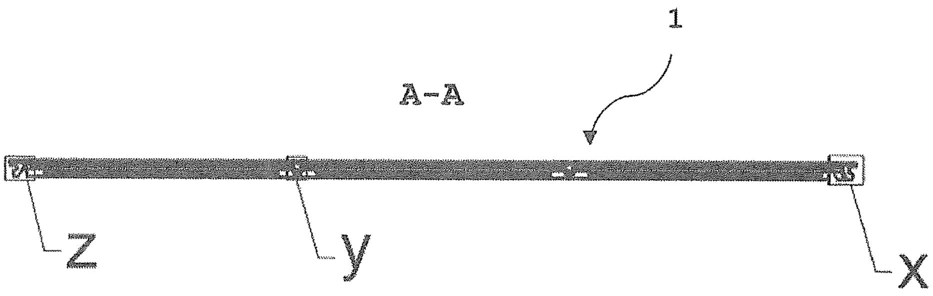

FIG. 2 shows a sectional view of the sieve 1 of FIG. 1 along the line A-A in FIG. 1. It can be seen that in the sections denoted with x, y, z there are provided elastomeric parts 5*a*, 5*b*, 5*c*.

Figure 3A:
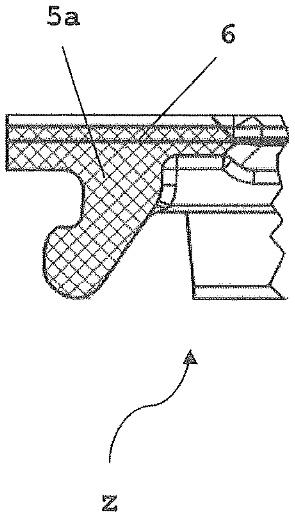
Figure 3B:
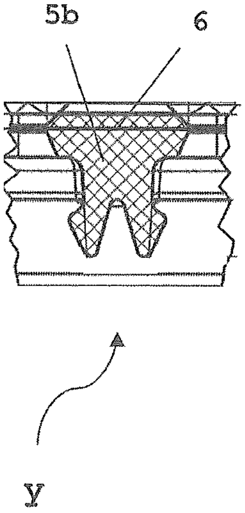
Figure 3C:
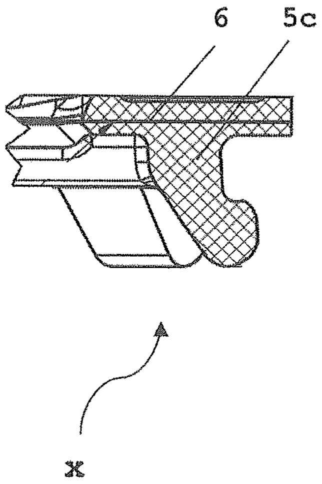

The sections x, y, z are shown in more detail in FIGS. 3*a*, 3*b* and 3*c*.

In sections x and z shown in FIGS. 3*a* and 3*c*, a cross-section of outer bars 2 is shown. The sieved fabric 6 is embedded within the outer bars 2. As described herein, this can be achieved by back-injection moulding of material forming the outer bars 2, such as a thermoplastic polyurethane, onto fabric 6. The region of the outer bars 2 below said fabric 6 has a nose-like shape on one side and a recess on the other side, for clicking the elastomeric parts 5*a*, 5*c* into appropriate counter-parts (for example the grooves 11*a* shown in FIG. 6 below).

In section y shown in FIG. 3*b*, a cross-section of inner bar 3 is shown. The sieved fabric 6 is embedded within the inner bar 3. As described herein, this can be achieved by back-injection moulding of material forming the inner bars 3, such as a thermoplastic polyurethane, onto fabric 6. The region of the inner bar 3 below said fabric 6 has a click-like shape, for clicking the elastomeric part 5*b* into appropriate counter-parts (for example the grooves 11*b* shown in FIG. 6 below). Said clip-like shape comprises two separate elongated portions extending away from each other. In the embodiment shown in FIG. 3*b*, said separate elongated portions extend away from each other enclosing between them an angle from 5° to 10°.

Figure 4:
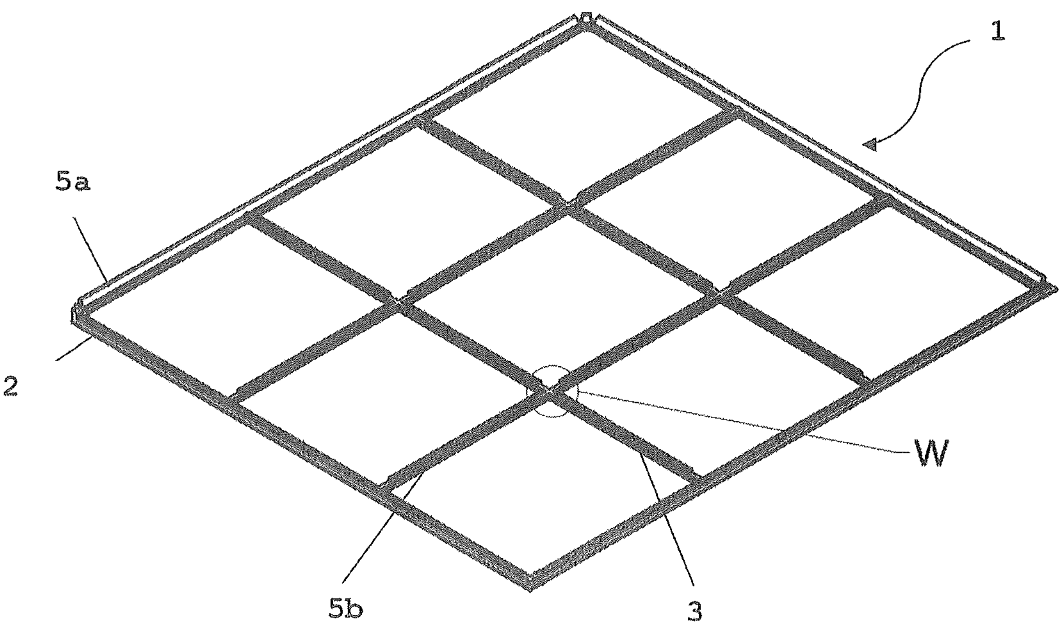
FIG. 4 shows a perspective view of an embodiment of a sieve according to the present invention

FIG. 4 shows a perspective view of an embodiment of the sieve 1 according to the present invention. In FIG. 4, the surface of the sieve 1 is shown where the elastomeric parts 5*a*, 5*b*, 5*c* are provided.

Figure 5:
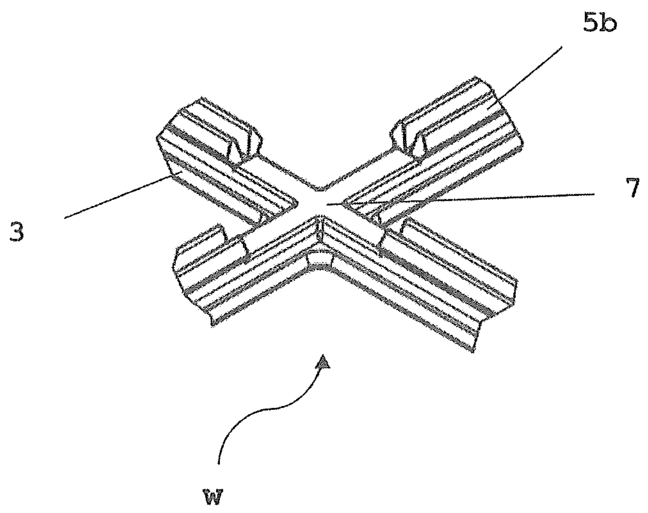
FIG. 5 is an enlarged view of the section w of the sieve of FIG. 4

FIG. 5 is an enlarged view of the section w of the sieve of FIG. 4. It can be seen that the elastomeric parts 5*b* of the inner bars 3 are not provided in cross-section areas 7 of said inner bars 3, i.e. areas where inner bars 2 intersect.

Figure 6:
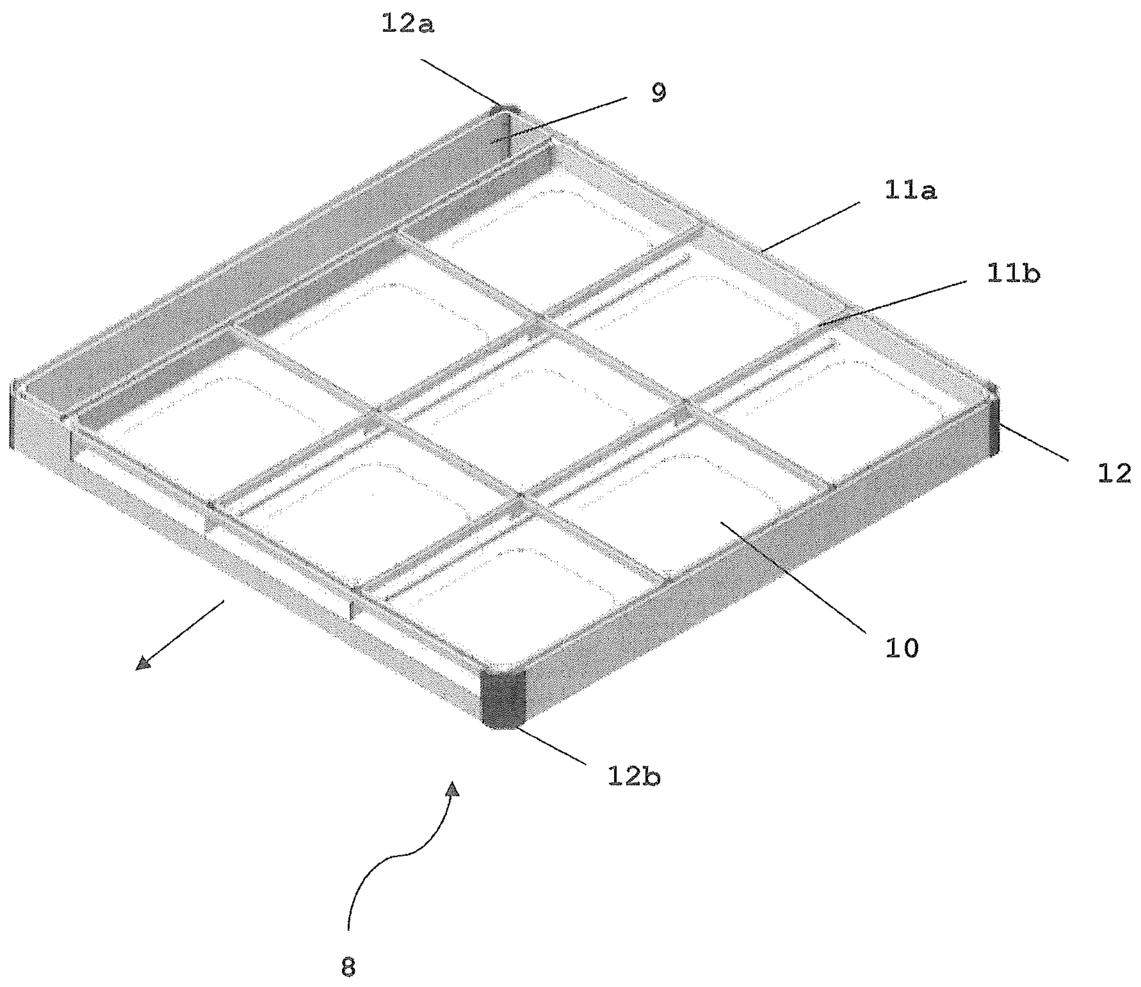
FIG. 6 shows a perspective view of an embodiment of a sieve frame according to the present invention

FIG. 6 shows a perspective view of an embodiment of a sieve frame 8 according to the present invention. The sieve frame 8 of the embodiment of FIG. 6 is made of stainless steel and comprises four outer profiles 11*a* and edges 12. The outer profiles 11*a* comprise a groove on their upper surface, respectively. The edges 12 comprise a lower end 12*b* and an upper end 12*a*.

In the embodiment of FIG. 6, an additional outlet is provided in one outer profile 11*a*, at a side indicated by an arrow.

Inner profiles 11*b* are arranged such between the outer profiles 11*a* that nine bottom areas 10 of the same area, as well as a side outlet 9 are formed in the area enclosed by the outer profiles 11*a*. Also the inner profiles 11*b* comprise a groove on their upper surface, respectively.

The grooves on the upper surface of the outer profiles 11*a* and inner profiles 11*b* are counter-parts for the elastomeric parts 5*a*, 5*b*, 5*c* of the outer bars 2 and inner bars 3 of the sieve 1. Said elastomeric parts 5*a*, 5*b*, 5*c* can be inserted into said grooves while said elastomeric parts 5*a*, 5*b*, 5*c* are in a second tensioned state. As a result, the fabric 6 of the sieve 1 is tensioned when the sieve 1 is fixed to the sieve frame 8.

Figure 7:
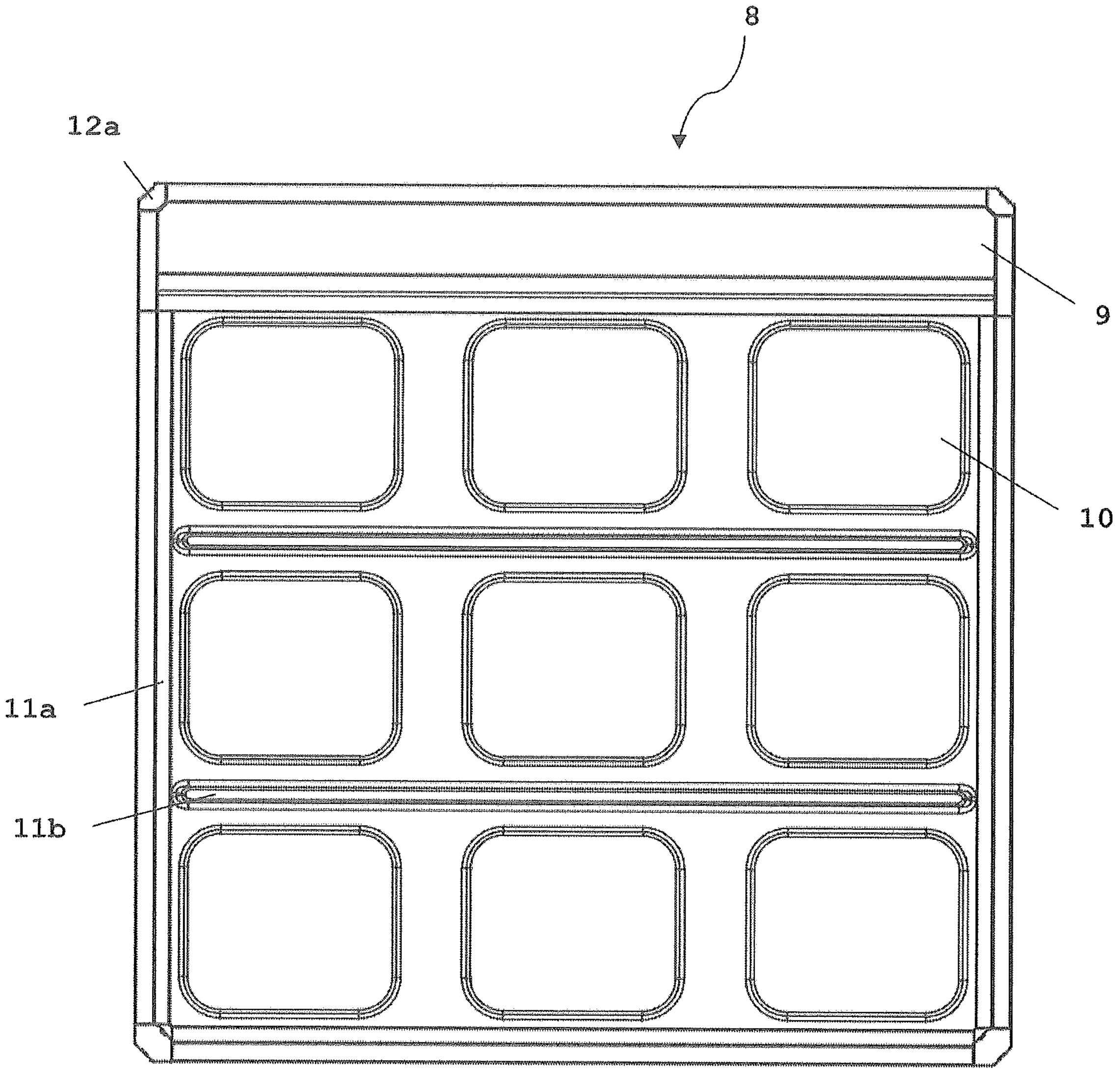
FIG. 7 shows a top view of the embodiment of the sieve frame according to FIG. 6

FIG. 7 shows a top view of the embodiment of the sieve frame 8 according to FIG. 6.

Figure 8:
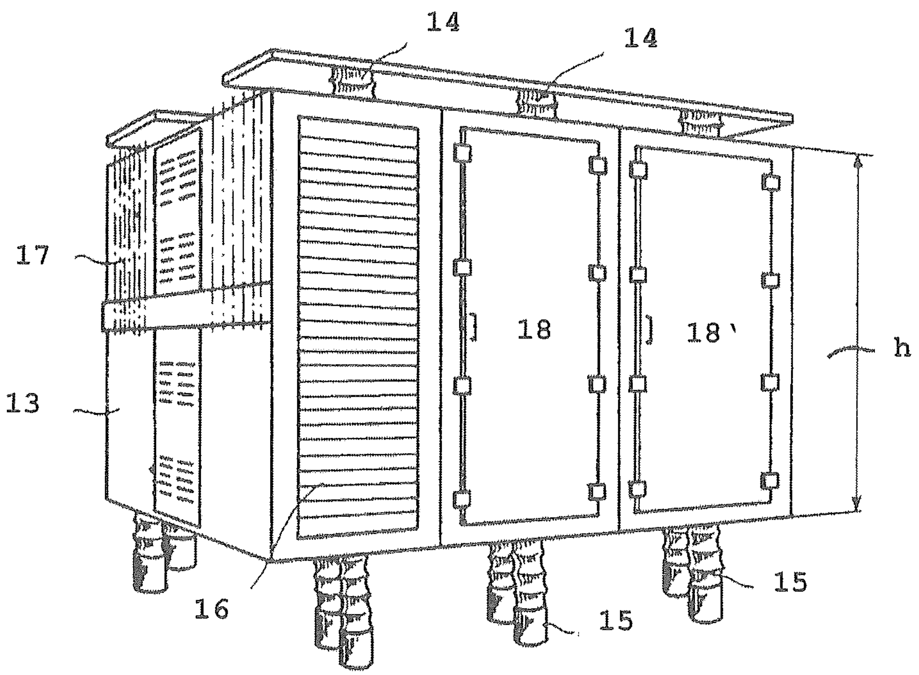
FIG. 8 shows an embodiment of a plansifter according to the present invention In the figures, same references numbers denote the same parts.

In FIG. 8, an entire plansifter 13 is shown with a door 18 removed from a sieve compartment, so that an entire sieve stack 16 is visible. In the plansifter 13, the sieve stack 16 comprises sieve frames 8 to which the sieves 1 are fixed, as described above. With the sieves 1 and sieve frames 8 according to the present invention, the number of sieves 1 and sieve frames 8 that can be provided over the height h of the plansifter 13 can be increased while maintaining the spaces for product conveying above the sieve stack 16. The entire plansifter 13 has a swing drive (not shown) which imposes a circular motion on all the sieves 1; for this purpose, the plansifter 13 is suspended as a cantilever on rods 17. The material is fed to the sieve stacks 16 via inlet ports 14, and the sorted material is discharged via outlet ports 15. The plansifter 13 is also equipped with a discharge conveyor (not shown).

The invention claimed is:

1. A sieve detachably securable to a sieve frame, the sieve comprising:
- at least one outer bar;
- at least one inner bar; and,
- a sieving fabric,
- wherein, a portion of the sieving fabric is disposed between the at least one outer bar and the at least one inner bar to form at least one sieving area;
- wherein at least a portion of the at least one outer bar comprises an elastomeric part and at least a portion of the at least one inner bar comprises an elastomeric part; and,
- wherein the elastomeric parts are transitionable between a first untensioned state and a second tensioned state.

2. The sieve according to claim 1,
- wherein the sieve comprises four outer bars that are connected so as to form a rectangle or a square,
- wherein the sieving fabric is disposed between the four outer bars, and
- wherein the at least one inner bar is arranged within said rectangle or a square, such that a plurality of sieving areas are formed.

3. The sieve according to claim 1, wherein the sieving fabric is integrally connected with the at least one outer bar and the at least one inner bar.

4. The sieve according to claim 1, wherein the elastomeric part of the at least one outer bar comprises a protrusion having a nose-like shape.

5. The sieve according to claim 1, wherein the elastomeric part of the at least one inner bar comprises a protrusion having a clip-like shape with two separate elongated portions extending away from each other.

6. The sieve according to claim 1, wherein the elastomeric part of the at least one outer bar extends along an entire length of the at least one outer bar.

7. The sieve according to claim 1, wherein the elastomeric part of the at least one inner bar extends along an entire length of the at least one inner bar.

8. A sieve frame configured to detachably receive a sieve:
- the sieve frame comprising a side outlet area and a bottom plate, at least one outer profile, and at least one inner profile, wherein the at least one outer profile and at least one inner profile each comprise a respective groove proximate respective upper surfaces thereof,
- the sieve comprising at least one outer bar, at least one inner bar, and a sieving fabric, wherein, a portion of the sieving fabric is disposed between the at least one outer bar and the at least one inner bar to form at least one sieving area, wherein at least a portion of the at least one outer bar comprises an elastomeric part and at least a portion of the at least one inner bar comprises an elastomeric part, and wherein the elastomeric parts are transitionable between a first untensioned state and a second tensioned state,
- wherein, the sieve is detachably securable to the sieve frame by inserting the elastomeric parts of the sieve into the respective grooves of the at least one outer profile and the at least one inner profile of the sieve frame.

9. The sieve frame according to claim 8 comprising a plurality of outer profiles, wherein the plurality of outer profiles are connected to each other via edges having an upper end and a lower end.

10. The sieve frame according to claim 8, wherein the sieve frame is made of stainless steel.

11. A sieving device, comprising:
- a sieve frame comprising a side outlet area and a bottom plate, at least one outer profile, and at least one inner profile, wherein the at least one outer profile and at least one inner profile each comprise a respective groove proximate respective upper surfaces thereof,
- the sieve comprising at least one outer bar, at least one inner bar, and a sieving fabric, wherein, a portion of the sieving fabric is disposed between the at least one outer bar and the at least one inner bar to form at least one sieving area, wherein at least a portion of the at least one outer bar comprises an elastomeric part and at least a portion of the at least one inner bar comprises an elastomeric part, and wherein the elastomeric parts are transitionable between a first untensioned state and a second tensioned state,
- wherein, the sieve is detachably securable to the sieve frame by inserting the elastomeric parts of the sieve into the respective grooves of the at least one outer profile and the at least one inner profile of the sieve frame.

12. The sieving device according to claim 11, wherein more than one sieve frame is provided.

13. The sieving device according to claim 11, comprising a plan sifter of at least one of a food, an animal feed mill, a purifier, or a cleaning machine.

14. The sieve according to claim 1, comprising at least two inner bars that intersect one another, wherein the elastomeric parts of the at least two inner bars extend along a length of each of the plurality of each inner bar, except those portions of the plurality of the inner bars that one another.

* * * * *